United States Patent
Hyun et al.

(10) Patent No.: US 8,944,619 B2
(45) Date of Patent: Feb. 3, 2015

(54) NANOPARTICLE COMPLEX, LIGHT CONVERSION MEMBER AND DISPLAY DEVICE HAVING THE SAME, AND METHOD FOR FABRICATING THE SAME

(75) Inventors: Soon Young Hyun, Seoul (KR); June Roh, Seoul (KR); Kyung Jin Kim, Seoul (KR); Jae Hong Lee, Seoul (KR); Ja Ram Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/110,051

(22) PCT Filed: Mar. 21, 2012

(86) PCT No.: PCT/KR2012/002025
§ 371 (c)(1),
(2), (4) Date: Oct. 22, 2013

(87) PCT Pub. No.: WO2012/138068
PCT Pub. Date: Oct. 11, 2012

(65) Prior Publication Data
US 2014/0043790 A1    Feb. 13, 2014

(30) Foreign Application Priority Data
Apr. 4, 2011 (KR) .................. 10-2011-0030878

(51) Int. Cl.
| F21V 9/16 | (2006.01) |
| F21V 9/08 | (2006.01) |
| G02F 1/1335 | (2006.01) |
| C09K 11/02 | (2006.01) |
| B82Y 20/00 | (2011.01) |

(52) U.S. Cl.
CPC ............ *F21V 9/08* (2013.01); *G02F 1/133603* (2013.01); *C09K 11/025* (2013.01); *G02F 2001/133614* (2013.01); *B82Y 20/00* (2013.01); *Y10S 977/773* (2013.01); *Y10S 977/952* (2013.01)
USPC .......... 362/84; 252/301.36; 977/773; 977/952

(58) Field of Classification Search
USPC ........................................ 362/84; 252/301.36
See application file for complete search history.

(56) References Cited

U.S. PATENT DOCUMENTS

| 6,037,922 A | 3/2000 | Yagyu |
| 7,819,539 B2 | 10/2010 | Kim et al. |
| 2004/0196428 A1 | 10/2004 | Mochizuki et al. |
| 2010/0027192 A1* | 2/2010 | Perry et al. .................. 361/323 |

FOREIGN PATENT DOCUMENTS

| GB | 201017941 | * 12/2010 |
| JP | 2005-316263 A | 11/2005 |
| JP | 2009-282410 A | 12/2009 |
| KR | 10-0240971 B1 | 1/2000 |
| KR | 2006-515935 A | 6/2006 |
| KR | 10-2010-0046698 A | 5/2010 |
| KR | 10-2010-0049277 A | 5/2010 |

* cited by examiner

*Primary Examiner* — Mary Ellen Bowman
(74) *Attorney, Agent, or Firm* — Birch, Stewart, Kolasch & Birch, LLP (57) ABSTRACT

Disclosed are a light conversion member, a display device including the same, and a method for fabricating the same. The light conversion member includes a host, a plurality of light conversion particles in the host, and a ferroelectric material in the host.

12 Claims, 9 Drawing Sheets

NANOPARTICLE COMPLEX, LIGHT CONVERSION MEMBER AND DISPLAY DEVICE HAVING THE SAME, AND METHOD FOR FABRICATING THE SAME

TECHNICAL FIELD

The embodiment relates to a nano-particle complex, a light conversion member and a display device including the same, and a method for fabricating the same.

BACKGROUND ART

A light emitting diode (LED) is a semiconductor device that converts electricity into ultraviolet ray, visible ray or infrared ray by using characteristics of compound semi-conductors. The LED is mainly used for home appliances, remote controllers and large-size electric signboards.

A high-brightness LED is used as a light source for a lighting device. Since the LED represents the superior energy efficiency and long life span, the replacement cost thereof may be reduced. In addition, the LED is strong against vibration and impact and it is not necessary to use toxic substances, such as Hg, so the LED substitutes for a glow lamp and a fluorescent lamp in terms of energy saving, environmental protection and cost reduction.

In addition, the LED may be advantageously used as a light source for a middle-size or large-size LCD TV and a monitor. When comparing with a cold cathode fluorescent lamp (CCFL) mainly used in a liquid crystal display (LCD), the LED represents superior color purity and low power consumption and can be fabricated in a small size, so various products equipped with the LED have been produced and studies for the LED have been actively performed.

DISCLOSURE OF INVENTION

Technical Problem

The embodiment relates to a light conversion member having an improved optical characteristic, a display device including the same, and a method for fabricating the same.

Solution to Problem

According to the embodiment, a light conversion member includes a host, a plurality of light conversion particles in the host, and a ferroelectric material in the host.

According to the embodiment, a nano-particle complex includes a nano-particle, and a ferroelectric particle bonded around the nano-particle.

According to the embodiment, a display device includes a light source, a light conversion member to change a wavelength of a light emitted from the light source, and a display panel to display an image by using the light converted by the light conversion member.

In order to prepare a nano-particle complex according to the embodiment, a nano-particle is formed, a ferroelectric particle is formed, and the ferroelectric particle is bonded to the nano-particle.

In order to fabricate a light conversion member, a resin composition including a plurality of light conversion particles and a ferroelectric material is formed, and the resin composition is cured.

Advantageous Effects of Invention

As described above, according to the embodiment, when the light conversion member is fabricated, the resin composition includes ferroelectric materials. Accordingly, the ferroelectric materials can be spontaneously polarized, and the ferroelectric materials, which have been spontaneously polarized, can surround the light conversion particles. In addition, the ferroelectric materials can be bonded to the light conversion particles.

Therefore, the light conversion particles and the ferroelectric particles can constitute the nano-particle complexes, and repulsive force acts between the nano-particle complexes by the ferroelectric particles. Therefore, the light conversion particles can be prevented from being condensed to each other, and can be spaced apart from each other at a constant interval by the ferroelectric materials.

As described above, in the state that the light conversion particles are spaced apart from at a constant interval, the resin composition is cured, so that the light conversion member according to the embodiment is formed.

Therefore, the light conversion member according to the embodiment includes the light conversion particles uniformly dispersed therein. Therefore, the light conversion member according to the embodiment can have light conversion performance of high efficiency. In addition, since the display device according to the embodiment includes the light conversion member representing an improved optical characteristic, the display device can represent high brightness and color reproduction.

MODE FOR THE INVENTION

In the description of the embodiments, it will be understood that when a layer (or film), a region, a pattern, or a structure is referred to as being "on" or "under" another substrate, another layer (or film), another region, another pad, or another pattern, it can be "directly" or "indirectly on the other substrate, layer (or film), region, pad, or pattern, or one or more intervening layers may also be present. Such a position of the layer has been described with reference to the drawings. The thickness and size of each layer shown in the drawings may be exaggerated, omitted or schematically drawn for the purpose of convenience or clarity. In addition, the size of elements does not utterly reflect an actual size.

Figure 1:
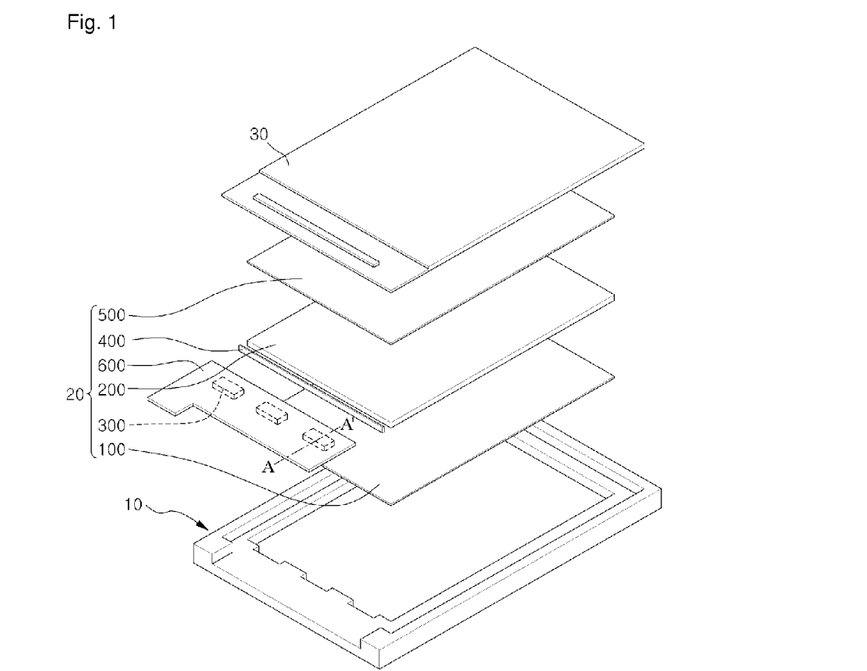
FIG. 1 is an exploded perspective view showing a liquid crystal display according to the embodiment.
Figure 2:
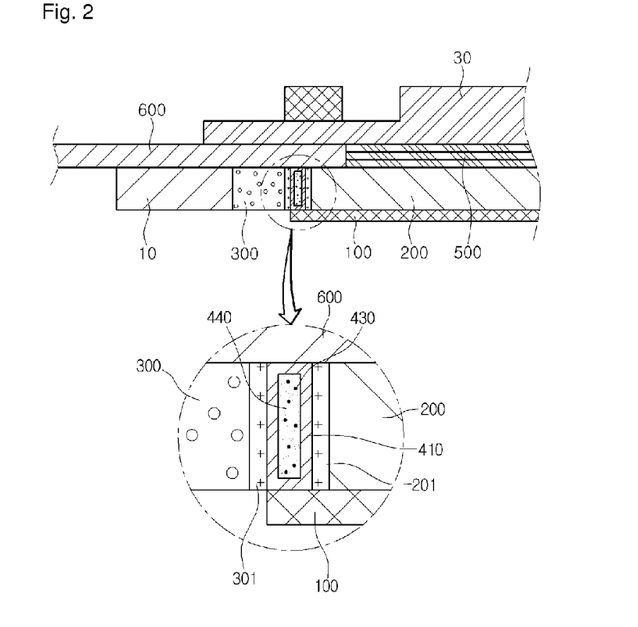
FIG. 2 is a sectional view taken along line A-A' of FIG. 1.
Figure 3:
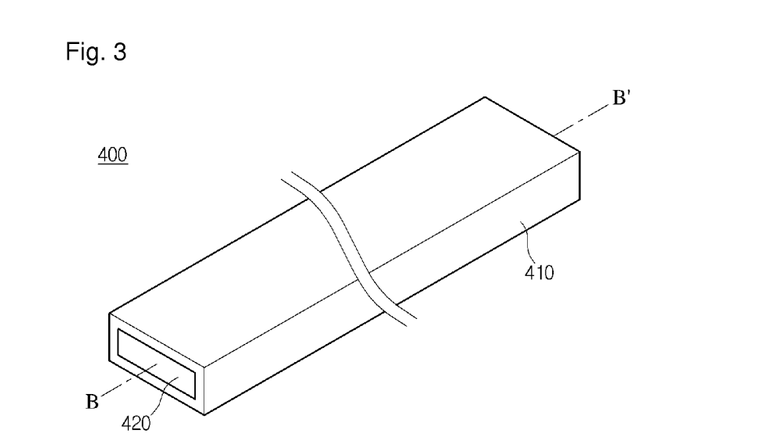
FIG. 3 is a perspective view showing a light conversion member according to the embodiment.
Figure 4:
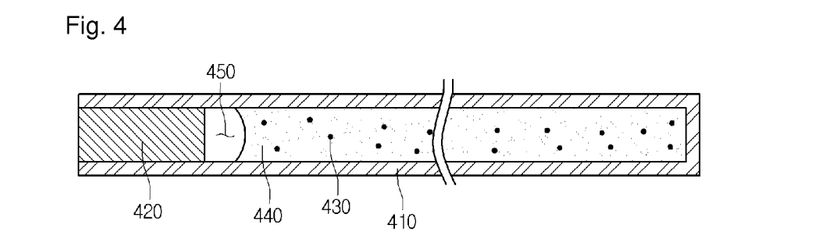
FIG. 4 is a sectional view taken along line B-B' of FIG. 3.
Figure 5:
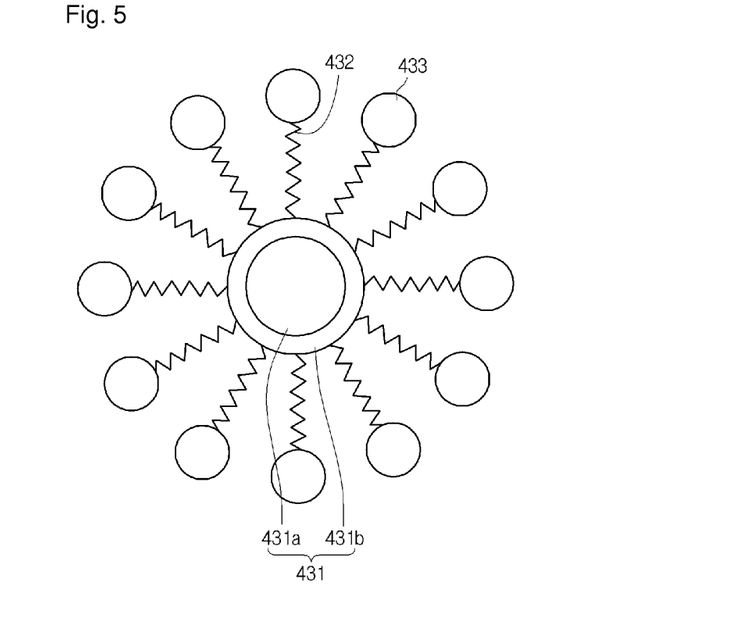
FIG. 5 is a view showing a light conversion complex.
Figure 6:
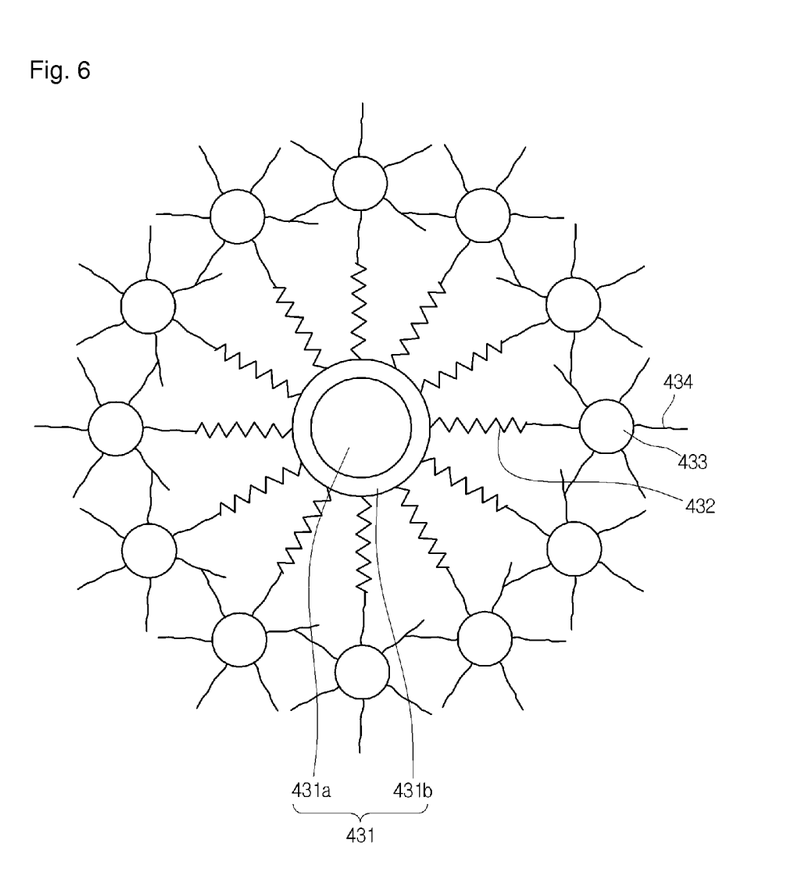
FIG. 6 is a view showing another example of a light conversion complex.

FIG. 1 is an exploded perspective view showing a liquid crystal display according to the embodiment. FIG. 2 is a sectional view taken along line A-A' of FIG. 1. FIG. 3 is a perspective view showing a light conversion member according to the embodiment. FIG. 4 is a sectional view taken along line B-B' of FIG. 3. FIG. 5 is a view showing a light conversion complex. FIG. 6 is a view showing another example of a light-conversion complex.

Referring to FIGS. 1 to 6, a liquid crystal display according to the embodiment includes a mold frame 10, a backlight assembly 20 and a liquid crystal panel 30.

The mold frame 10 receives the backlight assembly 20 and the liquid crystal panel 30 therein. The mold frame 10 has the shape of a rectangular frame. The mold frame 10 may include plastic or reinforced plastic.

In addition, a chassis may be disposed under the mold frame 10 to surround the mold frame 10 while supporting the backlight assembly 20. The chassis may be disposed at a lateral side of the mold frame 10.

The backlight assembly 20 is disposed inside the mold frame 10 to emit light toward the liquid crystal panel 30. The backlight assembly 20 includes a reflective sheet 100, a light guide plate 200, light emitting diodes 300, a light conversion member 400, a plurality of optical sheets 500, and a flexible printed circuit board (FPCB) 600.

The reflective sheet 100 reflects light emitted from the light emitting diodes 300 upward.

The light guide plate 200 is disposed on the reflective sheet 100 to guide the light, which is emitted from the light emitting diodes 300, upward by reflecting, refracting and scattering the light incident thereto from the light emitting diodes 300.

The light guide plate 200 includes an incident surface facing the light emitting diodes 300. From among lateral sides of the light guide plate 200, a lateral side facing the light emitting diodes 300 may serve as the incident surface.

The light emitting diodes 300 are disposed at the lateral side of the light guide plate 200. In detail, the light emitting diodes 300 are disposed at the incident surface.

The light emitting diodes 300 serve as a light source for generating the light. In detail, the light emitting diodes 300 emit the light toward the light conversion member 400.

The light emitting diodes 300 may include a blue light emitting diode generating the blue light or a UV light emitting diode generating the UV light. In detail, the light emitting diodes 300 can emit the blue light having the wavelength band of about 430 nm to about 470 nm or the UV light having the wavelength band of about 300 nm to about 400 nm.

The light emitting diodes 300 are mounted on the FPCB 600. The light emitting diodes 300 may be disposed under the FPCB 600. The light emitting diodes 300 are driven by receiving a driving signal through the FPCB 600.

The light conversion member 400 is interposed between the light emitting diodes 300 and the light guide plate 200. In detail, the light conversion member 400 is bonded to the lateral side of the light guide plate 200. In more detail, the light conversion member 400 is attached to the incident surface of the light guide plate 200. In addition, the light conversion member 400 can be bonded to the light emitting diodes 300.

The light conversion member 400 receives the light from the light emitting diodes 300 to convert the wavelength of the light. For instance, the light conversion member 400 may convert the blue light emitted from the light emitting diodes 300 into the green light and the red light. In detail, the light conversion member 400 may convert a part of the blue light into the green light having the wavelength in the range of about 520 nm to about 560 nm, and another part of the blue light into the red light having the wavelength in the range of about 630 nm to about 660 nm.

In addition, the light conversion member 400 may convert the UV light emitted from the light emitting diodes 300 into the blue light, the green light and the red light. In detail, the light conversion member 400 may convert a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light can be generated by the light passing through the light conversion member 400 and the lights converted by the light conversion member 400. In detail, the white light can be incident into the light guide plate 200 through the combination of the blue light, the green light and the red right.

As shown in FIGS. 3 and 4, the light conversion member 400 includes a tube 410, a sealing part 420, a plurality of light conversion complexes 430, and a host 440.

In addition, the light conversion member 400 may further include a dispersing agent.

The tube 410 receives the sealing part 420, the light conversion complexes 430 and the host 440 therein. That is, the tube 410 may serve as a receptacle to receive the sealing part 420, the light conversion complexes 430 and the host 440. In addition, the tube 410 extends in one direction with a long length.

The tube 410 may have the shape of a rectangular tube. In detail, a section of the tube 410, which is vertical to the length direction of the tube 410, may have the rectangular shape. The section of the tube 410 which is vertical to the length direction of the tube 410 may have a width of about 0.6 mm and a height of about 0.2 mm. In other words, the tube 410 may include a capillary tube.

The tube 410 is transparent. The tube 410 may include glass. In other words, the tube 410 may be a glass capillary tube.

The sealing member 420 is provided in the tube 410. In detail, the sealing member 420 is provided at the end portion of the tube 410. The sealing member 420 seals the inner part of the tube 410. The sealing member 420 includes epoxy resin.

The light conversion complexes 430 are contained in the tube 410. In detail, the light conversion complexes 430 are uniformly dispersed in the host 440, and the host 440 is provided in the tube 410.

As shown in FIG. 5, each light conversion complex 430 includes light conversion particles 431, a plurality of ligands 432, and a plurality of ferroelectric particles 433. In other words, the light conversion member 400 includes a ferroelectric material 433. In this case, the ferroelectric material includes the ferroelectric particles 433.

The light conversion particles 431 convert wavelengths of lights emitted from the light emitting diode 300. The light conversion particles 431 receive the light emitted from the light emitting diode 300 to convert the wavelengths of the light. For instance, the light conversion particles 431 may convert the blue light emitted from the light emitting diodes 300 into the green light and the red light. That is, a part of the light conversion particles 431 may convert the blue light into the green light having the wavelength of about 520 nm to about 560 nm and another part of the light conversion particles 431 converts the blue light into the red light having the wavelength of about 630 nm to about 660 nm.

In addition, the light conversion particles 431 can convert the UV light emitted from the light emitting diodes 300 into the blue light, the green light and the red light. That is, a part of the light conversion particles 431 converts the UV light into the blue light having the wavelength in the range of about 430 nm to about 470 nm, and another part of the light conversion particles 431 converts the UV light into the green light having the wavelength in the range of about 520 nm to about 560 nm.

Further, a part of the light conversion particles 431 converts the UV light into the red light having the wavelength in the range of about 630 nm to about 660 nm.

In other words, if the light emitting diodes 300 are blue light emitting diodes that emit the blue light, the light conversion particles 431 capable of converting the blue light into the green light and the red light may be employed. In addition, if the light emitting diodes 300 are UV light emitting diodes that emit the UV light, the light conversion particles 431 capable of converting the UV light into the blue light, the green light and the red light may be employed.

Each light conversion particle 431 may have a diameter of about 1 nm to about 10 nm. In other words, the light conversion particles 431 may include nano-particles.

The light conversion particles 431 may include a plurality of quantum dots. The quantum dots may include core nano-crystals 431a and shell nano-crystals 431b surrounding the core nano-crystals 431a.

The shell nano-crystals may be prepared at least two layers. The shell nano-crystals 431b are formed on the surface of the core nano-crystals 431a. The quantum dots can lengthen the wavelength of the light incident into the core nano-crystals 431a by using the shell nano-crystals 431b forming a shell layer, thereby improving the light efficiency.

The quantum dots may include at least one of a group-II compound semiconductor, a group-III compound semiconductor, a group-V compound semiconductor, and a group-VI compound semiconductor. In detail, the core nano-crystals 431a may include CdSe, InGaP, CdTe, CdS, ZnSe, ZnTe, ZnS, HgTe or HgS. In addition, the shell nano-crystals 431b may include CuZnS, CdSe, CdTe, CdS, ZnSe, ZnTe, ZnS, HgTe or HgS.

For example, the wavelength of the light emitted from the quantum dot can be adjusted according to the size of the quantum dot.

In particular, if the size of the quantum dot is smaller than the Bohr radius of an exciton, which consists of an electron and a hole excited by lights and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle becomes small, so the fluorescent light having the wavelength band of visible ray can be generated by adjusting the size of the particles. In addition, the quantum dot represents the extinction coefficient, which is 100 to 1000 times higher than that of the general fluorescent pigment, and has the superior quantum yield as compared with the general fluorescent pigment, so that that strong fluorescent light can be generated.

The quantum dots can be synthesized through the chemical wet scheme. The chemical wet scheme is to grow the particles by immersing the precursor material in the organic solvent. According to the chemical wet scheme, the quantum dots can be synthesized.

The ligand 432 is bonded to the light conversion particle 431. In detail, one end of the ligand 432 may be bonded to the light conversion particle 431. In addition, the ligands 432 surround the light conversion particles 431. In more detail, one end of the ligand 432 is bonded to the outer surface of the light conversion particle 431 to surround the light conversion particle 431.

The ligand 432 may stabilize the unstable quantum dots after the synthesis process. Dangling bonds may be formed at the valence band after the synthesis process and the quantum dots may be unstable due to the dangling bonds. However, since one end of the ligand 432 is in the non-bonding state, one end of the ligand 432 is bonded to the dangling bonds, thereby stabilizing the quantum dots The ligand 432 may include pyridine, mercapto alcohol, thiol, phosphine or phosphine oxide. In addition, the ligand 432 may include polyethylene imine, (3-aminopropy)trimethoxysilane, mercapto-acetic acid, 3-mercapto propyl trimethoxysilane, or 3-mercaptopropionic acid. In addition, the ligands 432 may include various hydrophilic organic ligands.

The ferroelectric particles 433 are contained in the host 440. The ferroelectric particles 433 are provided around the light conversion particles 431. In detail, the ferroelectric particles 433 surround the light conversion particle 431.

The ferroelectric particles 433 are bonded to the light conversion particles 431. In detail, the ferroelectric particles 433 are bonded to the light conversion particles 431 through the ligand 432. In addition, the ferroelectric particles 433 may be bonded to an opposite end of the ligand 432. In other words, the light conversion particle 431 may be bonded to one end of the ligand 432, and the ferroelectric particles 433 may be bonded to the opposite end of the ligand 432.

The ferroelectric particles 433 include ferroelectric materials. The ferroelectric materials may include lead titanium oxide ($PbTiO_2$; PT), lead (zirconium, titanium) oxide ($Pb(Zr, Ti)O_2$; PZT), strontium bismuth tantalum oxide ($SrBi_2Ta_2O_9$; SBT), (bismuth, lanthanum) titanium oxide (($Bi,La)_4Ti_3O_{12}$; BLT), or bismuth iron oxide ($BiFeO_3$; BFO).

The ferroelectric particles 433 may be spontaneously polarized. In detail, in each ferroelectric particle 433, a portion facing the light conversion particle 431 has a polarity different from that of an opposite portion to the portion facing the light conversion particle 431. In detail, the ferroelectric particles 433 may have polarities different from each other in the diameter direction of the light conversion particle 431.

Each ferroelectric particle 433 has a diameter of about 1 nm to about 5 nm. The ferroelectric particle 433 may have a single structure or a shell structure the same as that of the quantum dot.

In addition, as shown in FIG. 6, each light conversion complex 430 may include the light conversion particle 431, a plurality of first ligands 432, a plurality of ferroelectric particles 433, and a plurality of second ligands 434.

The light conversion particle 431, the first ligand 432, the ferroelectric particles 433 may have structures substantially identical to those of the light conversion particle 431, the ligand 432, and the ferroelectric particles 433 of FIG. 5.

The second ligands 434 are provided around each ferroelectric particle 433. The second ligands 434 are bonded to each ferroelectric particle 433.

In addition, the second ligands 434 can stabilize the ferroelectric particles 433. For example, the second ligands 434 are bonded to a reactive defect, such as the dangling bond of the ferroelectric particles 433 to stabilize the ferroelectric particles 433.

The second ligand 434 may include pyridine, mercapto alcohol, thiol, phosphine, phosphine oxide, polyethylene imine, (3-aminopropy)trimethoxysilane, mercapto-acetic acid, 3-mercapto propyl trimethoxysilane, or 3-mercaptopropionic acid.

The first ligand 432 may be chemically bonded to the second ligand 434. For example, the first ligand 432 may be bonded to the second ligand 434 through a poly-condensation reaction such as a condensation reaction.

Therefore, the ferroelectric particles 433 are bonded to the light conversion particles 431 through the first and second ligands 432 and 434.

The host 440 surrounds the light conversion complexes 430. In other words, the conversion complexes 430 are uniformly dispersed in the host 440. The host 440 may include polymer. The host 440 is transparent. In other words, the host 440 may include transparent polymer.

The host 440 is provided in the tube 410. In other words, the host 440 is fully filled in the tube 410. The host 440 may closely adhere to the inner surface of the tube 410.

A non-active layer 450 is formed between the sealing member 420 and the host 440. The non-active layer 450 is filled with nitrogen. The non-active layer 450 serves as a buffer between the sealing member 420 and the host 440.

The dispersing agent is provided in the host 440. The dispersing agent allows the light conversion particles 431 to be uniformly dispersed in the host 440 when the light conversion member 400 is fabricated.

The dispersing agent may include silicon oil-based dispersing agent, sodium dodecylbenzenesulfonate, disodiumethoxylatenonylphenol half ester sulfasuxidinate, or dioctylestersodiumsulfasuxinate.

Referring to FIG. 2, the light conversion member 400 adheres to the light guide plate 200. A first adhesive layer 201 is interposed between the light conversion member 400 and the light guide plate 200, and the light conversion member 400 adheres to the lateral side of the light guide plate 200 through the first adhesive layer 201.

The first adhesive layer 201 is transparent. The first adhesive layer 201 may include epoxy resin or acrylic resin.

The light conversion member 400 adheres to the light emitting diode 300. A second adhesive layer 301 is interposed between the light conversion member 400 and the light emitting diode 300. The light conversion member 400 may adhere to the light exit surface of the light emitting diode 300 through the second adhesive layer 301.

The light conversion member 400 closely adheres to the second adhesive layer 301. In detail, the tube 410 adheres to the second adhesive layer 301. The second adhesive layer 301 is transparent. The second adhesive layer 301 may include epoxy resin or acrylic resin.

The optical sheets 500 are provided on the light guide plate 200. The optical sheets 500 enhance the characteristic of light passing through the optical sheets 500.

The FPCB 600 is electrically connected to the light emitting diodes 300. The FPCB 600 can mount the light emitting diodes 300 thereon. The FPCB 600 is installed in the mold frame 10 and arranged on the light guide plate 200.

The mold frame 10 and the backlight assembly 20 constitute the backlight unit. That is, the backlight unit includes the mold frame 10 and the backlight assembly 20.

The liquid crystal panel 30 is provided inside the mold frame 10, and provided on the optical sheets 500.

The liquid crystal panel 30 displays images by adjusting intensity of the light passing through the liquid crystal panel 30. That is, the liquid crystal panel 30 is a display panel to display the images. The liquid crystal panel 30 includes a TFT substrate, a color filter substrate, a liquid crystal layer interposed between the above two substrates and polarizing filters.

The light conversion complexes 430 include the ferroelectric particles 433. The ferroelectric particles 433 may be spontaneously polarized. When the ferroelectric particles 433 are spontaneously polarized, the outer surfaces of the light conversion complexes 430 may have the same polarity.

Therefore, repulsive force may act between the light conversion complexes 430. Therefore, when the light conversion member 400 is fabricated, the light conversion complexes 430 can be uniformly dispersed.

Therefore, the light conversion member 400 can be formed in such a manner that the light conversion complexes 430 can be spaced apart from at a constant interval, and the light conversion member 400 can represent high light transmittance and enhanced color reproduction.

In addition, the ratio of the light conversion complexes 430 can be easily adjusted, so that light conversion particles 431 more than a disable amount of light conversion particles can be prevented from being used.

Therefore, the liquid crystal display according to the embodiment can represent enhanced brightness and color reproduction, and the unnecessary consumption of the light conversion particles 431 can be reduced, so that the liquid crystal display can be easily manufactured at low cost.

FIGS. 7 to 12 are views showing a method for fabricating the light conversion member according to the embodiment. Hereinafter, the method for fabricating the light conversion member according to the present embodiment will be described by making reference to the above description about the light conversion member. In other words, the above description about the light conversion member will be incorporated in the description about the method for fabricating the light conversion member.

Figure 7:
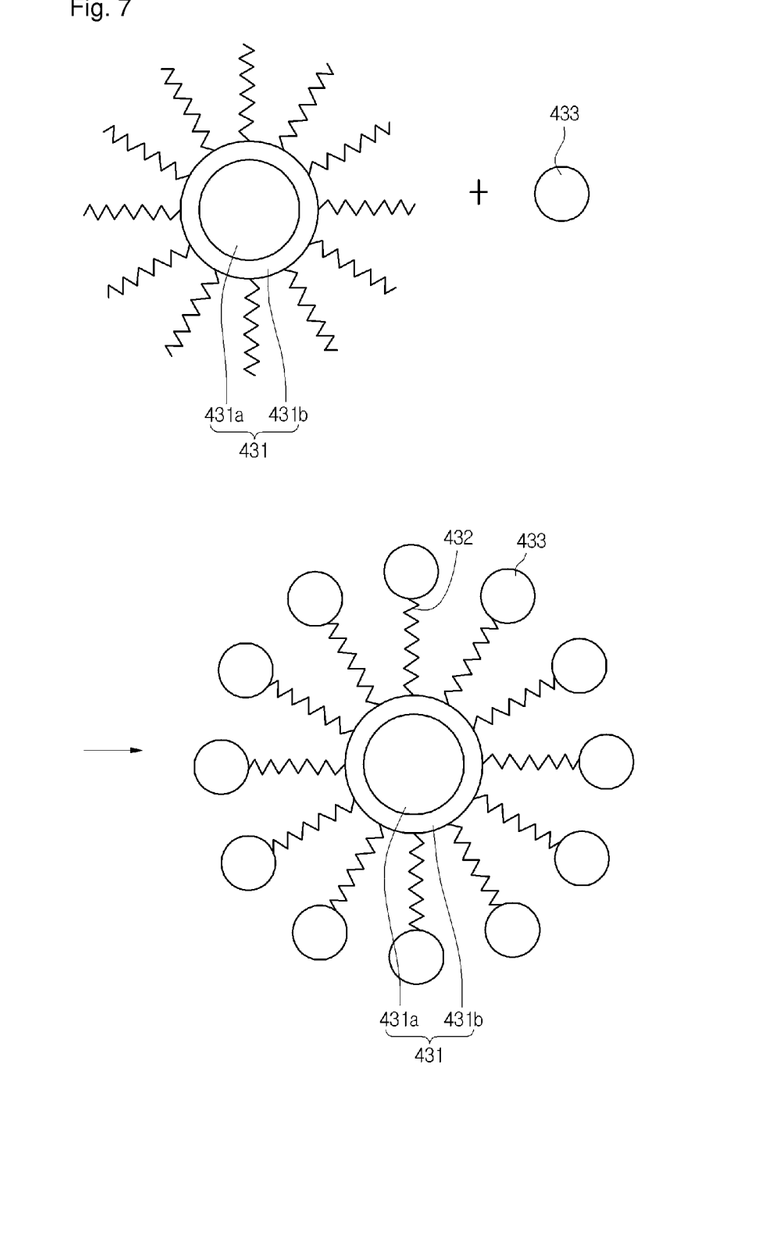
FIGS. 7 to 12 are views showing a method for fabricating a light conversion member according to the embodiment.

Referring to FIG. 7, a plurality of light conversion complexes 430 can be formed through the following method.

A core nano-crystal 431a may be formed through a wet scheme. In other words, precursor materials react to a solvent so that a crystal may be grown, and the core nano-crystal 431a may be formed.

For example, in order to form a CdS core nano-crystal, tri-n-octylphosphine oxide (TOPO), tri-butylphosphine (TBP), hexadecylamine (HDA), a surfactant, and a solvent may be used.

In addition, a cardmium precursor material may include cadmium oxide (CdO), cadmium sulfate (CdS), or cadmium acetate. A sulfur precursor material may include mercaptoethanol or sodium sulfide ($Na_2S$).

In addition, a shell nano-crystal 431b may be formed through a wet scheme. In other words, a precursor material may be additionally put into a solution containing the core nano-crystal 431a to allow the precursor material to react to the solution, so that a crystal is grown, thereby forming the shell nano-crystal 431b.

For example, in order to form a quantum dot having a CdS/ZnS structure, a zinc precursor material and the sulfur precursor material may be injected into the solution containing the CdS core nano-crystal 431a. The shell nano-crystal 431b may be formed through the reaction of the zinc precursor material to the sulfur precursor material, and a quantum dot having the CdS/ZnS structure may be formed. The zinc precursor material may include zinc acetate ($Zn(CH_3COO)_2$).

Thereafter, a plurality of ligands 432 may be bonded to the light conversion particles 431 such as the quantum dots. The ligands 432 may be additionally put into the solution containing the quantum dots 431, and the ligands 432 may be bonded to the quantum dots 431.

For example, mercapto-acetic acid is additionally put into the solution containing quantum dots having the CdS/ZnS structure, so that mercapto-acetic acid can be bonded to the quantum dots. A hydroxyl group (—OH) on the ZnS surface may be bonded to a carboxyl group (—COOH) of the mercapto-acetic acid through a dehydration reaction. In addition, since a Zn atom has an affinity property with respect to sulfur (S) of mercapto-acetic acid (MAA), the MAA can be easily bonded to the quantum dot having a CdS/ZnS structure.

In addition, the ferroelectric particles 433 may be formed through a sol-gel synthesis scheme, a vapor condensation scheme, a chemical precipitation scheme, or a hydrothermal synthesis scheme.

For example, in order to form the ferroelectric particles 433, metal organic compound and metal salt are hydrolyzed, so that a sol having colloidal particles dispersed therein is formed. Thereafter, a gel having the colloidal particles bonded to each other in a 3-D mesh structure is formed through condensation polymerization. Next, the ferroelectric particles 433 may be formed through dry and milling processes.

In detail, titanium isopropoxide ($Ti[OCH(CH_3)_2]_4$), 2-methoxyethanol, and lead acetate ($Pb(CH_3COO)_2 3H_2O$) may be used as starting materials. In addition, nitric acid ($HNO_3$) and sodium hydroxide ($NH_4OH$) are used as a catalyst.

In this case, titanium isopropoxide ($Ti[OCH(CH_3)_2]_4$) and 2-methoxyethanol are mixed with each other to form a solution A, and titanium isopropoxide ($Ti[OCH(CH_3)_2]_4$) and lead acetate ($Pb(CH_3COO)_2 3H_2O$) are mixed with each other to form a solution B. Thereafter, water is added to the solution B, and a sole is formed through hydrolysis. Next, solutions A and B are mixed with each other to form a gel, and lead (titanium) oxide may be formed through dry and milling processes.

Thereafter, the ferroelectric particles 433 are additionally put into a solution containing the quantum dot 431 bonded to the ligand 432, and the ferroelectric particles 433 are combined with the ligand 432 through the reaction. Therefore, the light conversion complexes 430 are formed.

For example, the quantum dot 431 bonded to the ligand 432 and the ferroelectric particles 433 are uniformly dispersed in the solvent such as methyl ethyl ketone (MEK). Thereafter, the dispersed liquid is subject to reaction at the temperature of about 70° C. for about three hours to four hours. In addition, the dispersed liquid may further contain surfactant. Thereafter, the solvent is volatilized at the temperature of about 90° C. to acquire the light conversion complexes 430.

Figure 8:
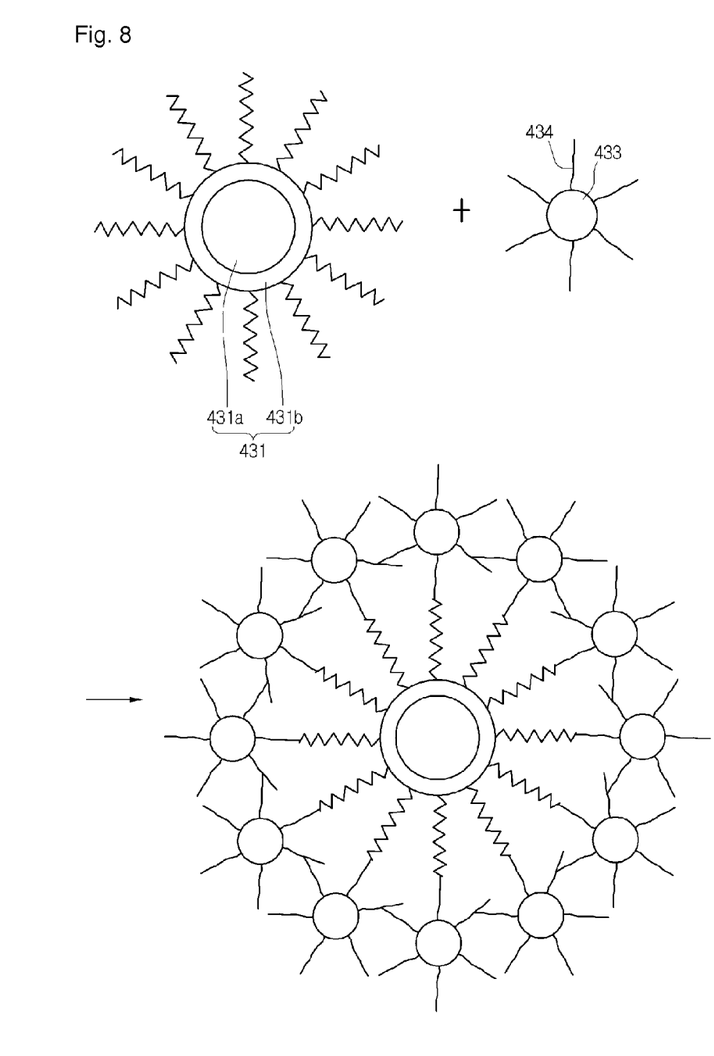

Alternatively, as shown in FIG. 8, the ferroelectric particles 433 may be bonded to the second ligand 434.

For example, the ferroelectric particles 433 including lead (zirconium or titanium) oxide is uniformly dispersed into the solvent such as methyl ethyl ketone (MEK). Thereafter, 3-mercapto propyl trimethoxysilane is added to the dispersed liquid, and the mixed solution is subject to reaction at the temperature of about 50° C. to about 80° C. for about eight hours, so that the second ligand 434 can be bonded to the ferroelectric particles 433. In addition, the surfactant may be added to the mixture.

Thereafter, the ferroelectric particles 433 bonded to the second ligand 434 is added to the solution containing the quantum dot 431 bonded to the first ligand, and the second ligand 434 may be bonded to the first ligand 432 through the reaction. The second ligand 434 may be bonded to the first ligand 432 through the condensation reaction. Therefore, the light conversion complexes 430 can be formed.

For example, the quantum dots 431 bonded to the first ligand 432 are uniformly dispersed in a solution containing the ferroelectric particles 433 bonded to the second ligand 434. The dispersed liquid made in the above manner may be subject to reaction at the temperature of about 70° C. for about four hours. Thereafter, the solvent is removed at the temperature of about 90° C., so that the light conversion complexes 430 can be formed.

Figure 9:
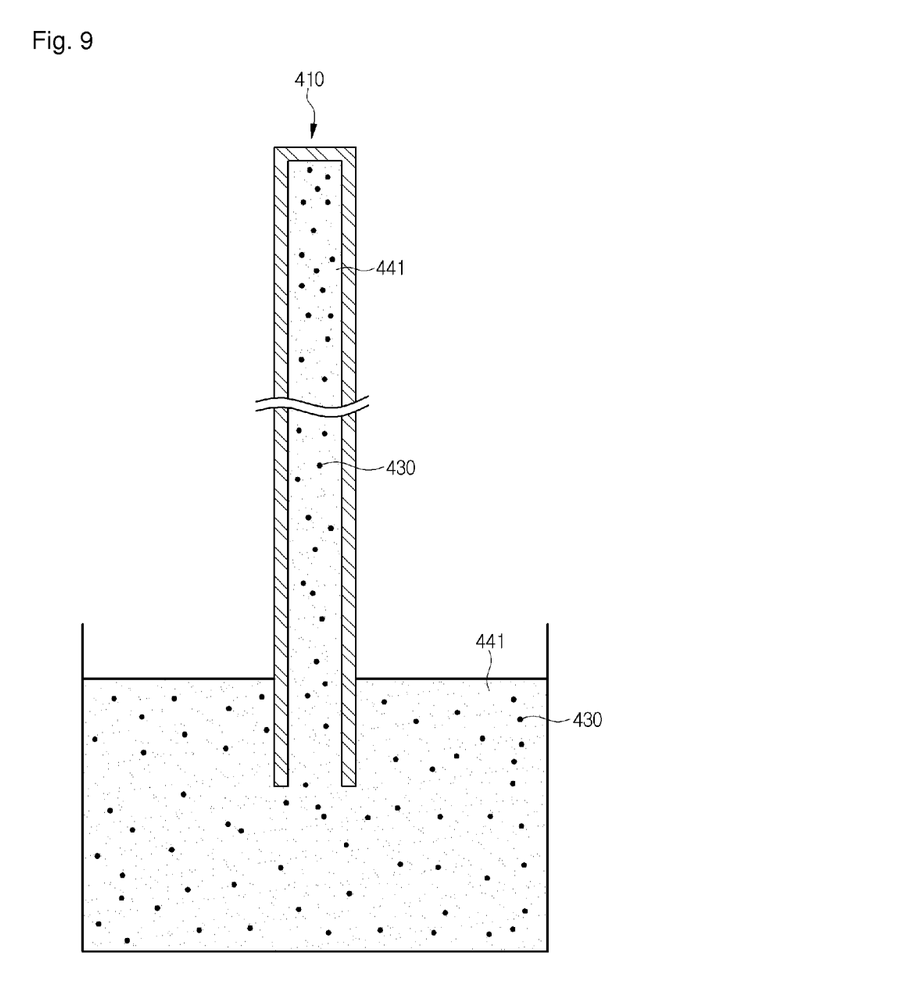

Referring to FIG. 9, the light conversion complexes 430 are uniformly dispersed into silicon-based resin. Therefore, a resin composition 441 including the light conversion complexes 430 is formed. In this case, in order to enhance the dispersibility of the light conversion complexes 430, a dispersing agent may be added to the resin composition 441. In addition, the resin composition 441 may further include a crossing-agent and a light curing initiator.

Then, internal pressure of the tube 410 is reduced, an inlet of the tube 410 is immersed in the resin composition 441 in which the wavelength conversion particles 431 are distributed, and ambient pressure is increased. Thus, the resin composition 411 having the light conversion particles 431 dispersed therein is introduced into the tube 410.

Figure 10:
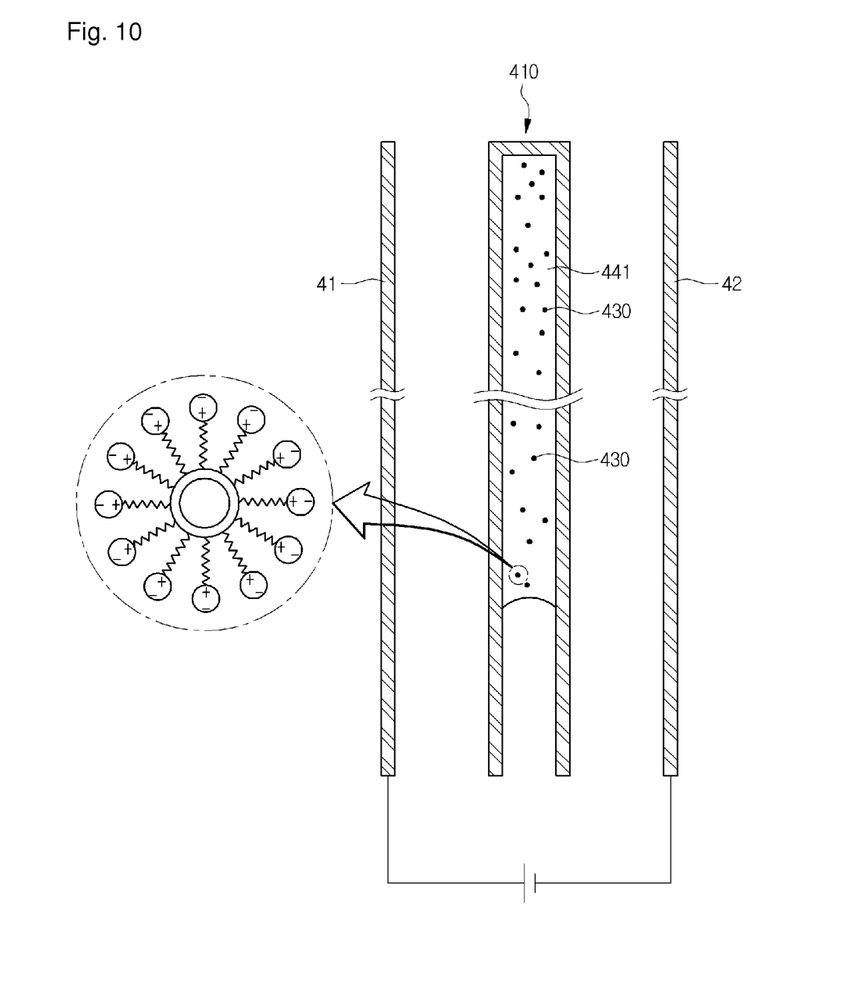

Referring to FIG. 10, a part of the resin composition 441 introduced into the tube 410 is removed and the inlet of the tube 410 becomes empty. Then, an electric field is applied to the resin composition 441, and the ferroelectric particles 433 are spontaneously polarized.

Therefore, the outer surfaces of the light conversion complexes 430, that is, the outer portions of the ferroelectric particles 433 represent the same polarity. As a result, repulsive force acts between the outer surfaces of the light conversion complexes 430, and the light conversion complexes 430 may be uniformly dispersed in the resin composition 441.

The process to apply the electric field is applicable to a predetermined process before the resin composition 441 is cured. In other words, after the resin composition 441 is formed, the electric field is applied in whole, so that the ferroelectric particles 433 may be spontaneously polarized. Thereafter, in the state that the light conversion complexes 430 are uniformly dispersed, the resin composition 441 may be injected into the tube.

Figure 11:
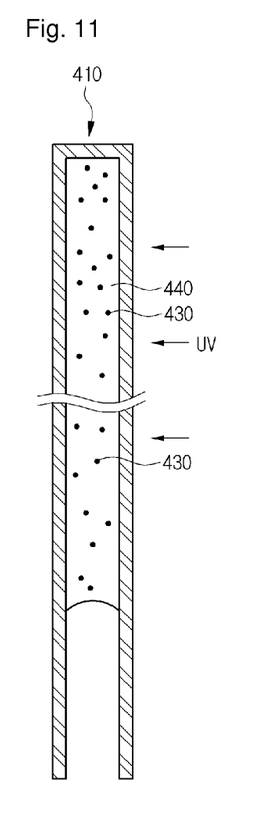

Referring to FIG. 11, the resin composition 441 introduced into the tube 410 is cured by the UV light, and the host 440 is formed.

Figure 12:
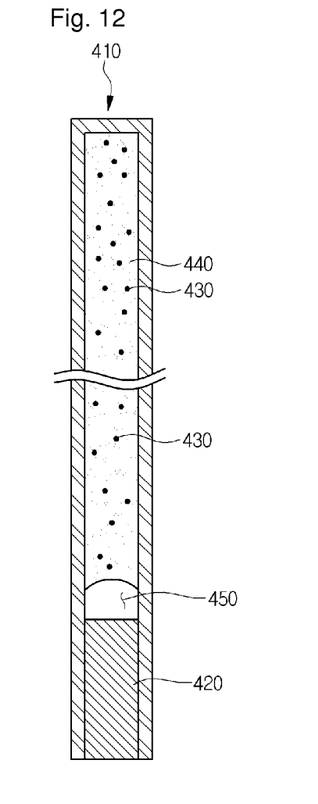

Referring to FIG. 12, an epoxy-based resin composition is introduced at the inlet of the tube 410. Thereafter, the epoxy-based resin composition 441 is cured, and the sealing member 420 is formed. The sealing member 420 is formed at a nitrogen atmosphere, so that the non-active layer 450 including nitrogen may be formed between the sealing member 420 and the host 440.

As described above, the light conversion complexes 430 can be uniformly dispersed in the resin composition 441 by the dispersing agent and the ferroelectric particles 433. In other words, the light conversion complexes 430 are spaced apart from each other at a constant interval due to electrostatic repulsive-force. In this state, the resin composition 441 can be cured.

Therefore, the light conversion member 400 according to the embodiment can have an improved optical characteristic. In addition, the light conversion member 400 according to the embodiment can represent high brightness and high color reproduction even if a smaller amount of light conversion complexes are used.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Experimental Example #1

A quantum dot solution having CdSe/ZnS-quantum dot bonded to a 3-mercapto propyl trimethoxysilane ligand therein was prepared. Thereafter, a solution containing PZT nano-particles were added to the quantum dot solution and was subject to the reaction at the temperature of about 70° C. for about 4 hours, to form a solution #1 containing a light conversion complex #1. Thereafter, the solvent contained in the solution #1 was removed, and the light conversion complex #1, the dispersing agent, and the silicon-based resin were mixed with each other to form the resin composition #1. Thereafter, the resin composition #1 was injected to the capillary tube. Next, after an electric field of about 3 mV was applied for about 3 minutes, the resin composition #1 injected into the capillary tube was cured, so that the light conversion member #1 is formed.

Experimental Example #2

A 3-mercapto propyl trimethoxysilane ligand was added to the solution containing the PZT nano-particles, and was subject to the reaction at the temperature of about 60° C. for about 7 hours. Thereafter, the solution having the ligand bonded to the PZT nano-particles was added to the quantum dot solution the same as experimental example #1, and was subject to reaction at the temperature of about 70° C. for about 4, to form solution #2 containing the light conversion complex #2

Thereafter, the light conversion member #2 was formed through a process the same as the process of experimental example #1.

Comparative Example

The quantum dots, the dispersing agent, and the silicon-based resin of Experimental Example #1 were mixed with each other, thereby forming the resin composition #3. Therefore, the resin composition #3 was injected to the capillary tube, and the light conversion member #3 was formed through the curing process the same as that of Experimental Example #1.

Result

The blue light having a wavelength of about 450 nm was irradiated onto the light conversion members #1, #2, and #3 under a stressed condition. Time in which the brightness of each of the light conversion members #1, #2, and #3 was lowered to 70% or less, and time in which the color coordinate of each of the light conversion members #1, #2, and #3 was lowered by 0.03% were measured. The light conversion member #1 had time more increased by 32.5% as compared with that of the light conversion member #3, and the light conversion member #2 had time more increased by 27.6% as compared with that of the light conversion member #3.

The invention claimed is:

1. A light conversion member comprising:
   a host;
   a plurality of light conversion particles in the host; and
   a ferroelectric material in the host,
   wherein the ferroelectric material includes ferroelectric particles,
   wherein the ferroelectric particles are bonded to the light conversion particle through a ligand, and
   wherein the ferroelectric particles are spontaneously polarized.

2. The light conversion member of claim 1, wherein the ferroelectric material is provided around the light conversion particle.

3. The light conversion member of claim 1, wherein the host contains a dispersing agent.

4. The light conversion member of claim 1, wherein the ferroelectric material includes a material selected from the group consisting of lead titanium oxide ($PbTiO_2$;PT), lead (zirconium, titanium) oxide ($Pb(Zr,Ti)O_2$;PZT), strontium bismuth tantalum oxide ($SrBi_2Ta_2O_9$;SBT), (bismuth, lanthanum) titanium oxide (($Bi,La)_4Ti_3O_{12}$;BLT), and bismuth iron oxide ($BiFeO_3$;BFO).

5. A nano-particle complex comprising:
   a nano-particle; and
   a ferroelectric particle bonded around the nano-particle,
   wherein the ferroelectric particle is spontaneously polarized.

6. A nano-particle complex of claim 5, further comprising:
   a first ligand bonded to the nano-particle; and
   a second ligand bonded to the ferroelectric particle,
   wherein the first ligand is chemically bonded to the second ligand, and the ferroelectric particle is bonded to the nano-particle through the first and second ligands.

7. A display device comprising:
   a light source;
   a light conversion member to change a wavelength of a light emitted from the light source; and
   a display panel to display an image by using the light converted by the light conversion member,
   wherein the light conversion member comprises:
   a host;
   a plurality of light conversion particles in the host; and
   a ferroelectric material in the host,
   wherein the ferroelectric material includes ferroelectric particles.,
   wherein the ferroelectric particles are bonded to the light conversion particle through a ligand, and
   wherein the ferroelectric particles are spontaneously polarized.

8. The display device of claim 7, wherein the light conversion member further comprises a tube receiving the host.

9. The display device of claim 7, wherein the ferroelectric material is provided around the light conversion particle.

10. The display device of claim 7, wherein the ferroelectric material includes a material selected from the group consisting of lead titanium oxide ($PbTiO_2$;PT), lead (zirconium, titanium) oxide ($Pb(Zr,Ti)O_2$;PZT), strontium bismuth tantalum oxide ($SrBi_2Ta_2O_9$;SBT), (bismuth, lanthanum) titanium oxide (($Bi,La)_4Ti_3O_{12}$;BLT), and bismuth iron oxide ($BiFeO_3$;BFO).

11. The display device of claim 7, wherein the ferroelectric material includes ferroelectric particles.

12. The display device of claim 11, wherein the ferroelectric particles are bonded to the light conversion particle through a ligand.

* * * * *